Patented May 9, 1933

1,907,879

UNITED STATES PATENT OFFICE

HEINRICH ROTH AND BODO ZSCHIMMER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF COLOR LAKES

No Drawing. Application filed August 8, 1927, Serial No. 211,622, and in Germany August 12, 1926.

It is known that color lakes, possessing excellent properties, can be obtained when basic dyestuffs which may also contain acid groups, are treated with complex acids, such for example as phosphotungstic acid, phosphomolybdic acid, phosphotungstomolybdic acid, silicomolybdic acid and the like or their salts, or with substances capable of giving rise to the formation of such complex acids.

We have now found that valuable, brightly colored compounds are obtained when mono- or polynuclear colorless or colored aromatic compounds, which contain one or more primary, secondary or tertiary amino groups, but are not basic dyestuffs and are free from acid groups, are acted upon by complex acids, such for example as phosphotungstic acid, phosphomolybdic acid, phosphotungstomolybdic acid, silicomolybdic acid and the like or their salts, or by substances capable of giving rise to the formation of such complex acids, the said substances being allowed to act simultaneously or in succession. Many of the resulting colored compounds are very fast to light and may be used with advantage, for example, as pigments for the production of fast dyeings.

The action of the complex acids, or the substances capable of giving rise to their formation, on the compounds containing the amino groups may be carried out in any convenient manner, preferably in solution, most suitable in aqueous solution. The operation may be performed under ordinary pressure, but it is often advantageous to subject the colored compounds to pressure, preferably at an elevated temperature, during or after their production. In the event of after-treatment under pressure, a favorable effect is produced in many instances by an addition of salts, especially such complex-formers as are not present, or are present only in insufficient amount, in the complex compounds. When substances capable of giving rise to the formation of complex tungsten compounds are used, it is preferable to work in the presence of acids possessing a considerable degree of dissociation, exceeding that of tartaric acid. The production of the new compounds may also be effected in the presence of the substrata usually employed in the color lake industry, such as heavy spar, blanc fixe, and the like. Moreover, additions of dispersive agents, such as Turkey-red oils, soaps, saponines, cholates, glue, gum tragacanth, suitable cellulose esters or ethers and the like and mixtures of such substances, may be employed to cause precipitation in a finely divided state.

When the action of the complex compounds on the aromatic amines is carried out in the presence of acids, in many cases the products obtained at first are colorless or only slightly colored, but these latter compounds can be easily converted into bright colored products, for example by warming the reaction mixture or neutralizing the free acid, or by adopting both of these measures.

Products possessing the same valuable properties, but having greater tinctorial power are produced, if in the production of the above-mentioned compounds, mixtures of the aromatic amino compounds above defined, which are free from acid groups and are not basic dyestuffs, with basic dyestuffs, or with such dyestuffs, as contain acid groups in addition to basic groups, are employed.

All of these colored compounds may also be produced in the presence of the substrata usually employed in the color-lake industry; and the process may be carried out with the addition of dispersive agents, such as salts of alkylated naphthalene-sulphonic acids, sodium cholate, Turkey-red oils and the like; the operation may also be carried out at an elevated temperature and under ordinary or elevated pressure. The temperature should of course not be so high that the colored compound would be decomposed or destroyed; generally temperatures above 200° will not be employed.

The following examples will further illustrate how the said invention may be carried into practical effect but the invention is not restricted to these examples. The parts are by weight.

*Example 1*

25.4 parts of 4.4′-tetramethyl-diamino-diphenylmethane are dissolved in 100 parts of concentrated hydrochloric acid and stirred gradually, at from 20 to 25° C. into a solution of 200 parts of sodium phosphotungstomolybdate in 3000 parts of water. The precipitate, which is only faintly colored, turns deep blue on neutralization with sodium carbonate solution.

*Example 2*

27 parts of 4.4′-tetramethyl-diamino-benzhydrol are dissolved with 50 to 55 parts of concentrated hydrochloric acid in 2000 parts of water. A solution of 200 parts of sodium phosphotungstomolybdate in 2000 parts of water is then stirred gradually, at from 20 to 25° C. into the former solution, the whole being then diluted with 1000 parts of water. On neutralization with alkali, the precipitate acquires a deep bluish-violet color.

*Example 3*

A solution of 26.8 parts of 4.4′-tetramethyl-diamino-benzophenone in 500 parts of 20 per cent sulfuric acid is poured into 3000 parts of water, a solution of 200 parts of sodium phosphotungstomolybdate in 1000 parts of water being then added gradually, while stirring. The sulfuric acid employed for dissolving the tetramethyldiaminobenzophenone is neutralized, with the equivalent amount of caustic soda solution. After adding 2000 parts of water, the temperature is raised to from 65 to 70° C. and a 10 per cent solution of sodium carbonate is gradually added, at the same temperature, until no further increase in the color intensity of the orange-brown precipitate can be detected.

*Example 4*

12 parts of p-aminobenzaldehyde are dissolved in 2000 parts of hot water, with the addition of 25 parts of concentrated hydrochloric acid. On stirring this solution into a solution of 180 parts of sodium phosphotungstomolybdate, a red-orange precipitate is formed, the shade of which changes to orange on neutralization with sodium- or barium carbonate.

*Example 5*

6.75 parts of 4.4′-tetramethyldiaminobenzhydrol are dissolved with 12.8 parts of 20° Bé. hydrochloric acid in 1000 parts of water. To this solution is added the solution (1:100) of 12 parts of Victoria pure blue BO (obtainable by the condensation of tetra-ethyl-diamino-benzophene with mono-ethyl-alpha-napthylamine) a solution (1:20) of 42.5 parts of sodium phosphotungstomolybdate being then stirred in. After leaving the mixture to stand for about half an hour, the acid is partially neutralized with a solution (1:10) of 7 parts of calcined soda. The resulting colored pigment is washed in the usual way by repeated suffusion with water, settling and separating, and then finished. It forms a deep blue pigment, which is applicable especially in the color-lake industry.

The colored pigment may also be produced by first allowing the amine to act on the complex salt, then adding the basic dyestuff, and effecting the precipitation of the pigment by means of sodium carbonate solution.

*Example 6*

6.75 parts of 4.4′-tetramethyldiaminobenzhydrol are dissolved in 1000 parts of water, as described in Example 5, an aqueous solution (1:100) of 4 parts of light green SF yellowish (Schultz "Farbstofftabellen", 6th edn. No. 505) being then added, followed by the solution (1:20) of 42.5 parts of sodium phosphotungstate. After stirring for about an hour, the charge is neutralized with a solution (1:10) of 7 parts of calcined soda, and the precipitation is completed by the addition of a solution (1:10) of 4 parts of barium chlorid crystals.

The greenish-blue pigment is finished in the manner described in Example 5.

What we claim is:

1. The process of producing colored lakes which comprises treating a tetra-alkylated-diamino-benzhydrol with a substance selected from the class consisting of complex acids and salts thereof containing at least one of the elements molybdenum and tungsten, and substances giving rise to the formation of such complex acids.

2. Colored lakes comprising, in combination, a tetra-alkylated-diamino-benzhydrol and a complex acid containing at least one of the elements molybdenum and tungsten.

3. The process of producing colored lakes which comprises treating a tetra-alkylated-diamino compound of the following general formula:

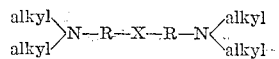

wherein R stands for a benzene nucleus free from acid groups and X stands for $CH_2$, CO or CHOH, with a substance selected from the class consisting of complex acids and salts thereof containing at least one of the elements molybdenum and tungsten, and substances giving rise to the formation of such complex acids.

4. The process of producing colored lakes which comprises treating a tetra-alkylated-diamino compound of the following general formula:

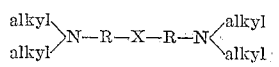

wherein R stands for a benzene nucleus free from acid groups and X stands for $CH_2$, CO or CHOH, mixed with a basic dyestuff containing acid groups in addition to basic groups, with a substance selected from the class consisting of complex acids and salts thereof containing at least one of the elements molybdenum and tungsten, and substances giving rise to the formation of such complex acids.

5. The process of producing colored lakes which comprises treating a tetra-methylated-diamino compound free from acid groups, of the group consisting of diphenylmethane, benzophenone and benzhydrol with a substance selected from the class consisting of complex acids and salts thereof containing at least one of the elements molybdenum and tungsten, and substances giving rise to the formation of such complex acids.

6. The process of producing colored lakes which comprises treating a tetra-methylated-diamino compound free from acid groups, of the group consisting of diphenylmethane, benzophenone and benzhydrol, mixed with a basic dyestuff containing acid groups in addition to basic groups, with a substance selected from the class consisting of complex acids and salts thereof containing at least one of the elements molybdenum and tungsten, and substances giving rise to the formation of such complex acids.

7. Colored lakes comprising in combination a tetra-alkylated-diamino compound of the general formula:

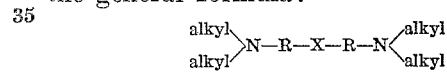

wherein R stands for a benzene nucleus free from acid groups and X stands for $CH_2$, CO or CHOH, and a complex acid containing at least one of the elements molybdenum and tungsten.

8. Colored lakes comprising in combination a tetra-alkylated-diamino compound of the general formula:

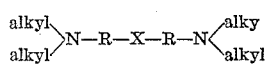

wherein R stands for a benzene nucleus free from acid groups and X stands for $CH_2$, CO or CHOH, a basic dyestuff and a complex acid containing at least one of the elements molybdenum and tungsten.

9. Colored lakes comprising in combination a tetra-methylated-diamino compound free from acid groups, of the group consisting of diphenylmethane, benzophenone and benzhydrol, and a complex acid containing at least one of the elements molybdenum and tungsten.

10. Colored lakes comprising in combination a tetra-methylated-diamino compound free from acid groups, of the group consisting of diphenylmethane, benzophenone and benzhydrol, a basic dyestuff, and a complex acid containing at least one of the elements molybdenum and tungsten.

In testimony whereof we have hereunto set our hands.

HEINRICH ROTH.
BODO ZSCHIMMER.